United States Patent [19]

Malpass et al.

[11] Patent Number: 5,063,188
[45] Date of Patent: Nov. 5, 1991

[54] CATALYST COMPONENT FOR ETHYLENE POLYERMIZATION AND COPOLYMERIZATION

[75] Inventors: Dennis B. Malpass, Peekskill; Bor-Ping E. Wang, Ossining, both of N.Y.

[73] Assignee: Texas Alkyls, Inc., Deer Park, Tex.

[21] Appl. No.: 505,378

[22] Filed: Apr. 6, 1990

[51] Int. Cl.$^5$ ............................................. C08F 4/64
[52] U.S. Cl. .................................. 502/116; 502/115; 502/119; 502/125
[58] Field of Search ................ 502/115, 116, 119, 125

[56] References Cited

U.S. PATENT DOCUMENTS 4,396,533  8/1983  Johnstone ........................... 502/113
4,780,443  10/1988  Matsuura et al. ................... 502/119

FOREIGN PATENT DOCUMENTS 0140536  8/1984  European Pat. Off. .
0261808  8/1987  European Pat. Off. .
8805056  12/1986  PCT Int'l Appl. .

*Primary Examiner*—Patrick P. Garvin
*Assistant Examiner*—Brent M. Peebles
*Attorney, Agent, or Firm*—Richard P. Fennelly; Louis A. Morris

[57] ABSTRACT

A catalyst component, adapted for use in the polymerization and copolymerization of ethylene, is formed by reaction of an organomagnesium compound and a tetraaalkyl silicate, contact of the resulting product with a chlorinating reagent, and treatment of the product from the previous step with liquid titanium halide.

11 Claims, No Drawings

CATALYST COMPONENT FOR ETHYLENE POLYERMIZATION AND COPOLYMERIZATION

BACKGROUND OF THE INVENTION

1. Field of the Invention

The present invention relates to a catalyst component for ethylene polymerization and copolymerization with other olefins.

2. Description of the Prior Art

The scientific literature (publication and patent literature) contains numerous examples of catalyst components for the homo- and copolymerization of ethylene. The following are exemplary: 1. European Patent Publication No. 140,536 describes a titanium halide-containing catalyst prepared by (1) reacting a magnesium hydrocarboyloxide with a silicon compound having at least one hydrogen-silicon bond; (2) contacting the resulting product with an electron donor; and (3) contacting the resulting product with a titanium halide;

2. PCT International Publication No. WO 88/05056 describes a catalyst component obtained by (1) treating an organomagnesium compound without chlorine with a solid silane compound containing one or two hydroxyl groups and (2) then with a titanium halide compound; and 3. European Patent Publication No. 261,808 describes formation of a catalyst component, useful in the polymerization of ethylene-propylene copolymer rubber, which is formed by contacting a metal oxide with a magnesium compound, such as a dialklmangesium, and subsequently contacting the resulting product with a titanium compound, such as titanium tetrachloride, or, optionally, first with an alcohol or a silicon compound.

SUMMARY OF THE INVENTION

The catalyst component of the instant invention is formed by: (1) reacting an organomagnesium compound with a tetraalkyl silicate; (2) contacting the resulting product with a chlorinated reagent; and (3) contacting the resulting product with a liquid titaneium compound containing halogen.

DETAILED DESCRIPTION OF THE INVENTION

The first step in the process for forming the catalyst component of the present invention involves the reaction of an organomagnesium compound with an alkoxy silane which serves to replace organo (e.g., alkyl) groups on the organomagnesium compound with alkoxy. This reaction is preferably conducted in a suitable hydrocarbon solvent (e.g., heptane) at reflux using substantially equimolar amounts of magnesium and silicon compounds. The organomagnesium compound is preferably a dialkylmagnesium compound of the formula $MgR_2$, where R is alkyl (e.g., $C_1$ to $C_8$ alkyl). Representative organomagnesium compounds include butylethylmagnesium, dibutylmagnesium, diisobutylmagnesium, and dihexylmagnesium. The alkoxy silane is of the formula $R_nSi(OR')_{4-n}$ with n ranging, for example, from 0 to 3, where R and R' are also alkyl (e.g., $C_1$ to $C_6$ alkyl). Representative compounds include tetraethyl silicate, tetramethyl silicate, tetrabutyl silicate, and dimethoxydiphenylsilane.

The foregoing reaction yields a solid product which comprises an admixture of magnesium alkoxide and silicon compounds which contain a typical magnesium content of about 17% to about 19%, by weight, and a silicon content of up to about 1%. This material is then contacted with a suitable chlorinating agent to yield a composition comprising a mixture of magnesium of the general formula $Mg(OR)_{2-n}Cl_n$, where R is as defined above and n can range from 0 to 2. Examples of suitable chlorinating agents include carbon tetrachloride, titanium tetrachloride, silicon tetrachloride and methyl trichlorosilane. The contacting conditions can be in a molar ratio of magnesium compound to chlorinating reagent of from about 2:1 to about 1:5.

The resulting product is an activated solid carrier and is then contacted with a liquid titanium halide, preferably at elevated temperature. The preferred titanium halide is titanium tetrahalide.

The catalyst component formed by the previously described steps can be combined with the organoaluminum cocatalyst components (e.g., trialkylaluminum) conventionally used in olefin polymerization reactions in conventional amounts (e.g., from about 200:1 moles of cocatalyst to titanium-containing component to about 5:1). A particularly preferred aluminum to titanium ratio is in the general range of from about 30:1 to 150:1.

The instant catalyst component is useful in the polymerization of ethylene and the copolymerization of ethylene with higher 1-olefins (e.g., those having four or more carbon atoms, such as butene-1, 4-methylpentent-1, hexene-1 and octene-1). The catalyst of the instant invention has an activity higher than that of catalysts formed by many magnesium chloride-supported titandium-containing catalysts. In addition, the present catalyst exhibits very good hydrogen response during the polymerization which enables production of polyethylene with high melt index (low molecular weight) which is especially suitable for certain processing technologies such as injection molding and rotomolding.

The instant invention is further illustrated by the Examples which follow.

EXAMPLE 1

This Example illustrates preparation of the catalyst carried used in the preparation of a catalyst in accordance with the present invention.

A 1-liter two-necked flask was equipped with two stopcocks and a TEFLON fluoropolymer-coated stirring bar. The system was evacuated three times replacing the atmosphere with nitrogen. To this flask 320 ml of heptane was added through a cannula. A syringe was used to add 243.6 g of butylethylmagnesium (BEM) heptane solution (0.45 mole) into the flask. Under rapid stirring, 100 ml of $Si(OEt)_4$ (0.45 mole) was charged into the flask by syringe. The solution was heated to 90°–95° C. A white precipitate was formed gradually. The mixture was stirred for one hour at 90°–95° C. until the BEM was consumed. The solid was washed with one liter of heptane, and was vacuum dried about four hours. The yield approached theoretical.

EXAMPLE 2

This Example illustrates preparation of the supported chloride-containing component of the present invention.

Inside a dry box under nitrogen, 32.1 g (0.236) of the solid product from Example 1 was charged into a 500 ml two-necked flask equipped with two stopcocks and a TEFLON fluoropolymer-coated stirring bar. About 300 ml of pure heptane was charged into the flask through a cannula. With stirring, under nitrogen, 39.9 g (0.235 mole) of $SiCl_4$ was added dropwise into the flask at ambient temperature. The solution was heated to 90°-95° C. The mixture was stirred at this temperature for one hour. The supernatant was removed by cannula and the remaining solid was washed with 1 liter of heptane. The final product was dried under vacuum. The yield was 35 g.

EXAMPLE 3

This Example illustrates preparation of the supported chloride-containing component of the present invention.

Inside a dry box under nitrogen 34.2 g (0.215 mole) of the solid product from Example 2 was charged into a 500 ml two-necked flask equipped with two stopcocks and a TEFLON fluoropolymer-coated stirring bar. About 250 ml of pure heptane was transferred into the flask. With stirring, under nitrogen, 12.98 g of $TiCl_4$ (0.068 mole) was slowly added to the flask at ambient temperature. The solution was heated to reflux temperature (98° C.). The reaction mixture was then stirred at refluxing temperature for one hour. The supernatant was removed by cannula and the remaining solid was washed with 2 liters of pure heptane. After vacuum drying, the yield for the catalyst component was 37.8 g of pale brown powder. The component contained 4.15% titanium, 14.10% magnesium, and 44.56% chlorine on a weight basis.

EXAMPLES b 4–9

These Examples illustrate the general procedure for the slurry polymerization of ethylene employing the novel catalyst of this invention.

The product of Example 3 was used in a standard ethylene polymerization test in a 4l Autoclave Engineers reactor. Data was compiled in Table 1. The procedure was as follows:

High purity, dry heptane (2 liters) was charged to the vessel. A syringe assembly was used to add the triisobutyl-aluminum cocatalyst. A total of 3.2 to 3.7 mmoles aluminum was introduced. A mineral oil catalyst slurry ($2.6 \times 10^{-5}$ to $3.0 \times 10^{-5}$ mole) was then charged to the vessel under ethylene purging. The contents were then heated to 50° C., hydrogen was charged and vented several times to sparge nitrogen and ethylene from reactor. Then a specific amount of hydrogen was charged to the vessel as a polymerization moderator. After reactor temperature reached 80° C., ethylene (100 to 130 psig) was introduced to the autoclave. The standard polymerization temperature was 85±1° C. After 60 minutes, polymerization was terminated by blocking the flow of ethylene and subsequently venting and cooling the vessel. Polyethylene was isolated as a white powder. Melt index (MI) and high load melt index (HLMI) were measured using ASTM D-1238 Condition E and Condition F. The melt index ratio is obtained by dividing HLMI by MI and is considered a measure of molecular weight distribution (MWD). Low MIR indicates narrow MWD.

TABLE 1

| CATALYST FOR ETHYLENE POLYMERIZATION[3] | | | | | | |
|---|---|---|---|---|---|---|
| Catalyst mg | Al/Ti | p[1] | A[2] | $H_2$ psig | MI | MIR |
| 34.0 | 120 | 8670 | 27.9 | 40 | 6.16 | 27.9 |
| 33.1 | 130 | 7843 | 25.3 | 40 | 6.19 | 29.2 |
| 29.4 | 141 | 9000 | 26.6 | 30 | 1.08 | 28.0 |
| 29.6 | 130 | 8520 | 25.1 | 30 | 2.01 | 29.2 |
| 29.7 | 138 | 10128 | 27.6 | 20 | 0.72 | 30.6 |
| 29.6 | 124 | 10182 | 27.8 | 20 | 1.03 | 28.4 |

[1]Productivity = g PE/g Catalyst.
[2]Activity = kg PE/gTi.atm.hr.
[3]$H_2$ at 50° C., ethylene to 150 psig at 85° C., 60 minutes polymerization.

EXAMPLES 10–13

These Examples illustrate the slurry copolymerization of ethylene and hexene-1 employing the novel catalyst of this invention.

All the copolymerization procedures were identical with Examples 4–9 except that hexene-1 was charged right after the cocatalyst was introduced.

Table 2 sets fourth the results obtained:

TABLE 2

| CATALYST FOR ETHYLENE AND HEXENE-1 COPOLYMERIZATION[3] | | | | | | | |
|---|---|---|---|---|---|---|---|
| Catalyst mg | Al/Ti | p[1] | A[2] | Hex-1 ml | MI | MIR | Density |
| 30.0 | 132 | 12417 | 33.8 | 60 | 6.82 | 30.7 | 0.948 |
| 28.0 | 144 | 13000 | 35.4 | 80 | 5.45 | 23.8 | 0.934 |
| 29.1 | 130 | 14123 | 38.5 | 100 | 6.17 | 24.1 | 0.944 |
| 29.0 | 125 | 15379 | 41.9 | 130 | 5.73 | 28.0 | 0.944 |

[1]Productivity = g PE/g Catalyst.
[2]Activity = kg PE/gTi.atm.hr.
[3]$H_2$ 20 psig at 50° C., ethylene to 150 psig at 85° C., 60 minutes polymerization.

COMPARATIVE EXAMPLE 14

The solid product from Example 1 (7.0 g, 0.06 mole Mg) was transferred from a dry box under nitrogen into a 500 ml two-necked flask equipped with two stopcocks and a TEFLON fluoropolymer coated stirring bar. Dry heptane (150 ml) was then charged into the flask, and with stirring, under nitrogen, 1.2 g of titanium tetrachloride (0.006 mole) was slowly added to the flask at ambient temperature. After the addition, the solution was heated to reflux temperature. The reaction mixture was then stirred at refluxing temperature for one hour. The supernatant was removed by cannula, and the remaining solvent was washed with one liter of pure heptane. The final product (Ti=3.88 wt %) was dried under vacuum.

The solid product, which has not been treated with silicon tetrachloride chlorinating agent in accordance with the present invention, was used as a catalyst for ethylene ( polymerization under the standard conditions described in Examples 4–9. The catalyst was found to have no catalytic activity.

The foregoing Examples are presented to illustrate certain embodiments of the present invention and should therefore not be construed in a manner to limit the invention. The scope of protection that is claimed is set forth in the claims which follow.

We claim:

1. A catalyst component for ethylene polymerization formed by:
   (1) reacting an organomagnesium compound with an alkoxy silane to replace organo groups on the organomagnesium compound with alkoxy to yield a product comprising magnesium alkoxide;
(2) contacting the product from step (1) with a chlorinating reagent; and
(3) contacting the product from step (2) with a liquid titanium halide.

2. A catalyst component as claimed in claim 1 wherein the organomagnesium compound is a dialkylmagnesium compound.

3. A catalyst component as claimed in claim 1 wherein the organomagnesium compound is a $C_1$–$C_8$ dialkylmagnesium compound and the alkoxy silane is a $C_1$–$C_6$ tetraalkyl silicate.

4. A catalyst component as claimed in claim 1 wherein the organomagnesium compound is butylethylmagnesium.

5. A catalyst component as claimed in claim 1 wherein the alkoxy silane is of the formula $R_nSi(OR')_{4-n}$ where n ranges from 0 to 3 and R and R' are alkyl.

6. A catalyst component as claimed in claim 1 wherein the chlorinating reagent is silicon tetrachloride.

7. A catalyst component as claimed in claim 1 wherein the chlorinating reagent is titanium tetrachloride.

8. A catalyst component as claimed in claim 1 wherein the liquid titanium halide is titanium tetrahalide.

9. A catalyst component as claimed in claim 5 wherein the organomagnesium compound is a dialkylmagnesium compound and the liquid titanium halide is titanium tetrahalide.

10. A catalyst component as claimed in claim 9 wherein the chlorinating agent is silicon tetrachloride.

11. A catalyst component as claimed in claim 9 wherein the chlorinating agent is titanium tetrachloride.

* * * * *